(12) United States Patent
Horiguchi (10) Patent No.: US 10,650,857 B2
(45) Date of Patent: May 12, 2020

(54) MAGNETIC DISK DEVICE AND CONTROL METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Yutaka Horiguchi, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/287,078

(22) Filed: Feb. 27, 2019

(65) Prior Publication Data

US 2020/0075054 A1 Mar. 5, 2020

(30) Foreign Application Priority Data

Sep. 4, 2018 (JP) .................... 2018-165068

(51) Int. Cl.
*G11B 20/12* (2006.01)
*G11B 19/04* (2006.01)
*G11B 17/028* (2006.01)

(52) U.S. Cl.
CPC .......... *G11B 19/048* (2013.01); *G11B 17/028* (2013.01)

(58) Field of Classification Search
CPC ............... G11B 27/02; G11B 27/026; G11B 2020/1893; G11B 20/18; G11B 27/36; G11B 20/12; G11B 33/20; G11B 7/00375; G11B 20/1883; G11B 20/1889; G11B 2020/1873

USPC ......... 369/47.13, 47.14, 53.41, 53.14, 53.15, 369/47.1, 53.17, 53.3; 360/75, 48, 53
See application file for complete search history.

(56) References Cited

U.S. PATENT DOCUMENTS

| 7,428,202 B2* | 9/2008 | Takahashi | G11B 20/10 369/47.1 |
| 7,936,649 B2* | 5/2011 | Park | G11B 20/10 369/47.13 |
| 7,957,236 B2* | 6/2011 | Blacquiere | G11B 20/1883 369/47.14 |
| 8,045,430 B2* | 10/2011 | Park | G11B 20/10009 369/47.14 |

(Continued)

FOREIGN PATENT DOCUMENTS

JP H05-066999 A 3/1993

*Primary Examiner* — Nabil Z Hindi
(74) *Attorney, Agent, or Firm* — White & Case LLP (57) ABSTRACT

According to one embodiment, a magnetic disk device includes a disk medium which has a first region, a second region, and a redundant third region, and a control circuitry. The first region is a region to which first data received from a host is written. The second region is a region to which the first data is temporarily written before the first data is written to the first region. The control circuitry executes defect detection to the first region. Upon detecting a defect, the control circuitry substitutes a first location having the defect in the first region with a second location in the third region. Depending on a total size of free regions of the third region, the control circuitry reallocates a fourth region from the second region to the third region. The fourth region is part or all of the second region.

16 Claims, 9 Drawing Sheets

(56) References Cited

U.S. PATENT DOCUMENTS 9,542,306 B2 1/2017 Kowles
2014/0122793 A1 5/2014 Inoue

* cited by examiner

MAGNETIC DISK DEVICE AND CONTROL METHOD

CROSS-REFERENCE TO RELATED APPLICATIONS

This application is based upon and claims the benefit of priority from Japanese Patent Application No. 2018-165068, filed on Sep. 4, 2018; the entire contents of which are incorporated herein by reference.

FIELD

Embodiments described herein relate generally to a magnetic disk device and a control method.

BACKGROUND

During operation of magnetic disk devices, a sector of a user region may fall in the situation that normal data read is unfeasible. A magnetic disk device detects such a sector as a defective sector. Upon finding a writing destination of data as a defective sector, the magnetic disk device writes the data to a preset alternative region in place of the user region. With no free region in the alternative region, the magnetic disk device prohibits reception of new data. In other words, in the case of no free region in the alternative region, a host cannot write new data to the magnetic disk device.

DETAILED DESCRIPTION

In general, according to one embodiment, a magnetic disk device includes a disk medium and a control circuitry. A first region, a second region, and a third region are allocated to the disk medium. The first region is a region to which first data received from a host is written. The second region is a region to which the first data is temporarily written before the first data is written to the first region. The third region is a redundant region. The control circuitry executes defect detection to the first region. In a case where a defect is detected in the first region, the control circuitry substitutes a first location having the defect in the first region with a second location in the third region. Depending on a total size of free regions of the third region, the control circuitry reallocates a fourth region from the second region to the third region. The fourth region is part or all of the second region.

Exemplary embodiments of a magnetic disk device and a control method will be explained below in detail with reference to the accompanying drawings. The present invention is not limited to the following embodiments.

First Embodiment

Figure 1:
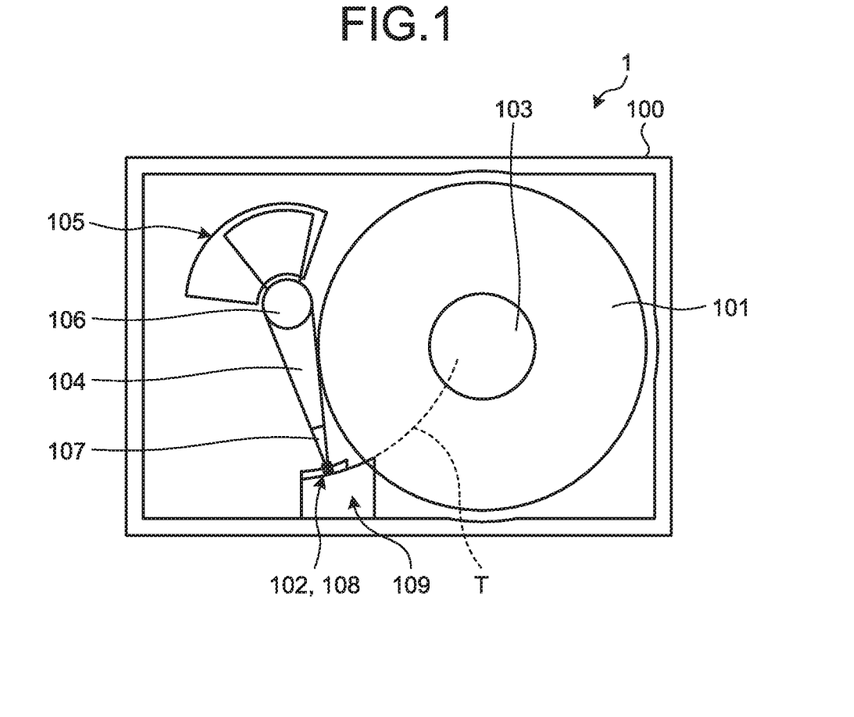
FIG. 1 is a diagram illustrating an example of a hardware configuration of a magnetic disk device according to a first embodiment.

FIG. 1 is a diagram illustrating an example of the hardware configuration of a magnetic disk device according to a first embodiment. FIG. 1 illustrates the inside of a housing 100 of a magnetic disk device 1 with a top cover removed. As illustrated in FIG. 1, the magnetic disk device 1 includes disk mediums 101 and magnetic heads 102 that read and write data.

The magnetic disk 101 (a first disk medium 101) illustrated in FIG. 1 is one of two disk mediums 101, and the other disk medium (a second disk medium 101; see FIG. 7) is located on the back side (a far side in FIG. 1) of the first disk medium 101. In the present embodiment, the number of the disk mediums 101 is exemplified as two, but the number of the disk mediums 101 may be one or three or more.

The first magnetic disk 101 and the second magnetic disk 101 are attached at a certain pitch along a rotating shaft 103 of a spindle motor, and rotate integrally with the rotating shaft 103 at the same rotation speed.

The magnetic heads 102 are each attached to a leading end of an arm 104. The arm 104 is driven by a voice coil motor (VCM) 105 and rotates within a set range around a shaft 106 in both positive and negative directions. By this operation, the magnetic head 102 moves on a broken line T and is positioned on any of tracks of the disk medium 101 in the radial direction. Total four sets of head units each including the magnetic head 102 and the arm 104 are mounted on the disk mediums 101, i.e., one set each on the front surfaces and the back surfaces of the two disk mediums 101. The head units can be specified by a head number.

Specifically, each magnetic head 102 is mounted on a head slider 108 at the edge of a suspension 107 placed at the leading end of the arm 104. The magnetic head 102 includes a read element and a write element, and the read element scans and reads data from an intended surface of the disk medium 101, and the writ element writes data onto the intended surface of the disk medium 101. In other words, the magnetic head 102 accesses the recording surface (storage region 110) of the disk medium 101. In the example illustrated in FIG. 1, the magnetic head 102 records and reads data onto and from the front surface of the first magnetic disk 101.

In addition, the magnetic disk device 1 includes a ramp load mechanism 109 that moves the magnetic head 102 away from the disk medium 101 for parking.

The magnetic disk device 1 includes a control circuit 20 (see FIG. 7) that controls the respective elements of the magnetic disk device 1, at the bottom, i.e., on the far side in FIG. 1. The control circuit 20 communicates with a host (see FIG. 7) via an interface such as a connection pin, which is attached to the housing 100 of the magnetic disk device 1 for external connection, and controls the respective elements of the magnetic disk device 1 in response to commands from the host 2.

Figure 2:
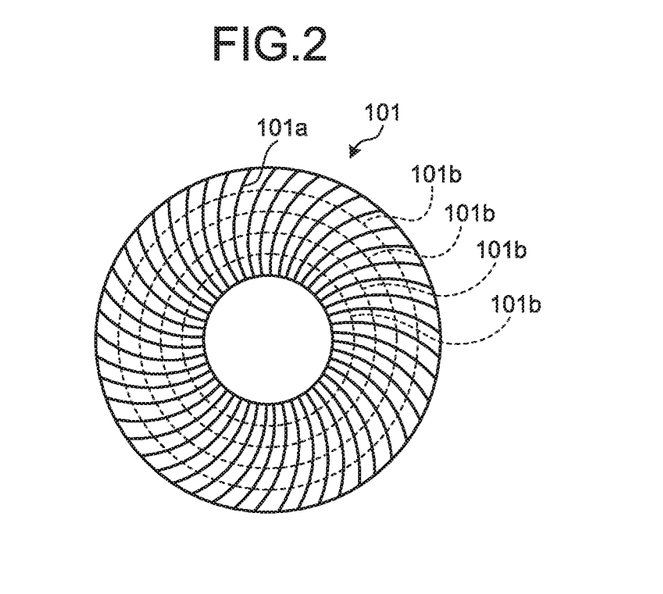
FIG. 2 is a diagram illustrating an example of a configuration of the magnetic disk according to the first embodiment.

FIG. 2 is a diagram illustrating an example of the configuration of the magnetic disk 101 according to the first embodiment. The magnetic disk 101 includes a platter provided with magnetic materials on both sides, and contains servo information written by a servo writer before shipment. The servo information refers to, for example, a burst pattern. FIG. 2 illustrates radially arranged servo zones 101a to which servo information is written, as an example of servo zone arrangement. The magnetic disk 101 includes a plurality of concentric tracks 101b at a certain pitch in the radial direction. Each track 101b includes a plurality of consecutive sectors on the circumference. Each sector includes a magnetic region, and data is rewritable thereto. The tracks 101b each including a large number of sectors constitute a storage region 110.

In the first embodiment, a user region 121, a media cache region 120, and an alternative region 122 are allocated to the storage region 110. The user region 121 is a region to which data received from the host 2 is written. The media cache region 120 is a region in which the data received from the host 2 is temporarily recorded before the data write to the user region 121. The alternative region 122 is a redundant region.

Figure 3:
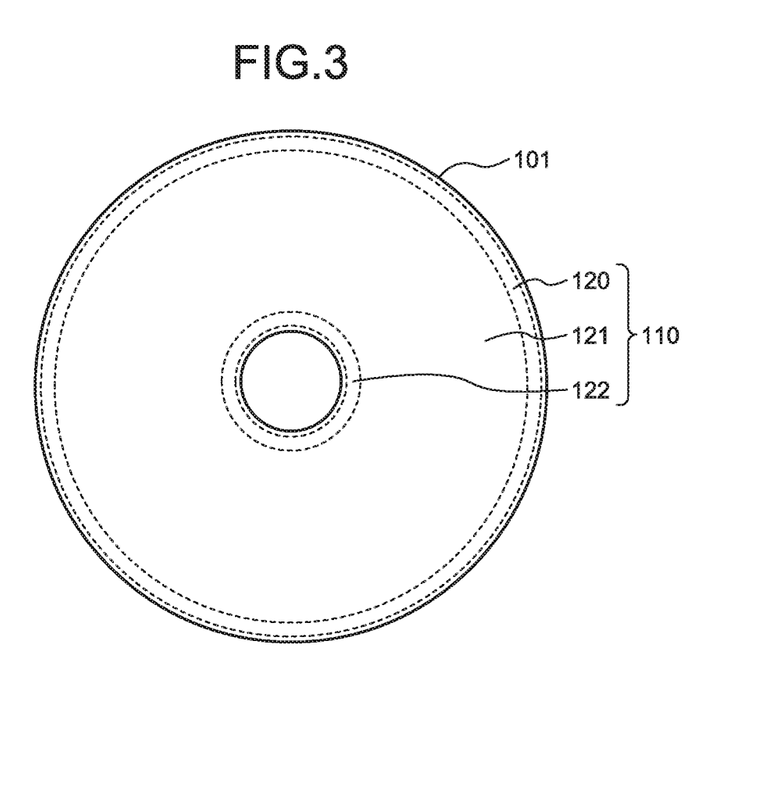
FIG. 3 is a diagram illustrating an example of locations of respective regions allocated to the magnetic disk according to the first embodiment.

FIG. 3 is a diagram illustrating an example of the allocation of the respective regions to the magnetic disk 101 according to the first embodiment. According to the example of FIG. 3, the media cache region 120, the user region 121, and the alternative region 122 are allocated in this order from the farthest position to the closest position relative to the radial center of the magnetic disk 101.

The user region 121 includes a large number of sectors. Each sector is associated with a logical address in the user region 121. The logical address refers to information indicating a location in a logical address space which the magnetic disk device 1 provides to the host 2. In other words, the user region 121 includes the number of sectors corresponding to a user capacity.

The media cache region 120 includes, for example, a plurality of sectors. The alternative region 122 includes at least one sector.

During the operation of the magnetic disk device 1, a situation that data is not normally readable from a certain sector may occur. It is not possible or difficult to read the same data (that is, correct data) as written data from such a sector. The magnetic disk device 1 detects such a sector as a defective sector.

Upon receiving data from the host 2, the magnetic disk device 1 writes the data to the media cache region 120, and transmits a notification indicating completion of the write operation to the host 2. The magnetic disk device 1 transfers the data written to the media cache region 120 to the user region 121 at certain timing. The destination of the data transfer is, for example, a sector, of the user region 121, associated with a logical address indicating the location of the data.

If the sector being the transfer destination in the user region 121 is a defective sector, the magnetic disk device 1 writes the data to the alternative region 122. Then, the magnetic disk device 1 changes the sector corresponding to the logical address indicating the location of the data from the defective sector to a sector of the alternative region 122 to which the data has been written. Thereby, the defective sector is substituted with the sector of the alternative region 122.

The substitution signifies that a storage region of the alternative region 122 equivalent to the size of the defective sector is used instead of the defective sector of the user region 121. The usage of the storage region includes reading as well as writing. Associating the logical address with the sector of the alternative region 122 in place of the correspondence between the defective sector of the user region 121 and the logical address is an example of a sector substitution. Since the logical address is associated with the sector in the alternative region 122, the written data in the alternative region 122 is read therefrom instead of the defective sector, upon receipt of a read request designating the logical address.

In this specification, changing the write destination of data from a sector of the user region 121 to a sector of the alternative region 122 is referred to as a substitution process.

In general, when there is no free region, that is, no substitutable sector, in the alternative region, the magnetic disk device transitions to a mode (write-protect mode) in which reception of new data is prohibited. This is because data written to the user region may be unreadable since the substitution process is unfeasible. Prohibition of the reception of new data means prohibition of processing a write command for writing new data. In other words, in the write-protect mode, the host cannot control the magnetic disk device to execute write commands.

In the first embodiment, by using the media cache region 120, the period for which data is receivable can be extended. Specifically, with no region available in the alternative region 122, the magnetic disk device 1 deletes part of the media cache region 120 and adds the deleted part to the alternative region 122.

Figure 4:
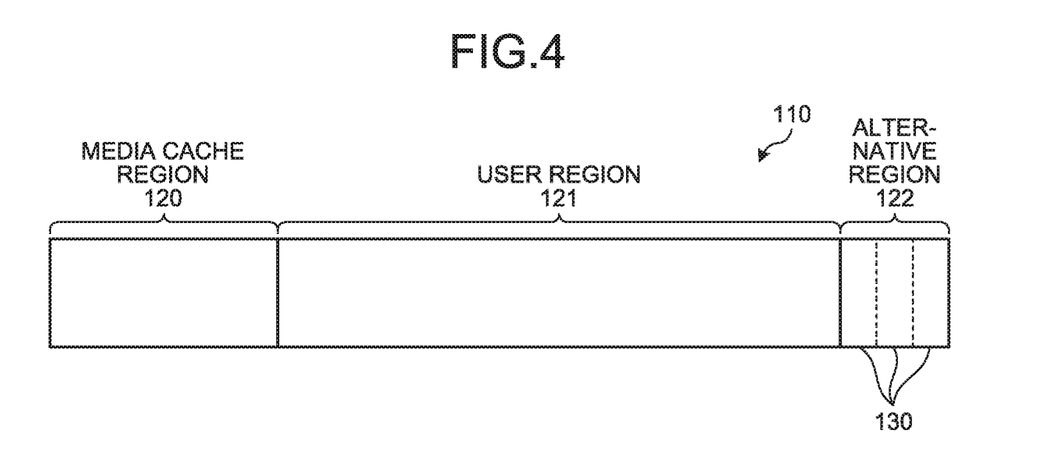
FIG. 4 is an exemplary schematic diagram for illustrating an overview of a characteristic process of the first embodiment.
Figure 5:
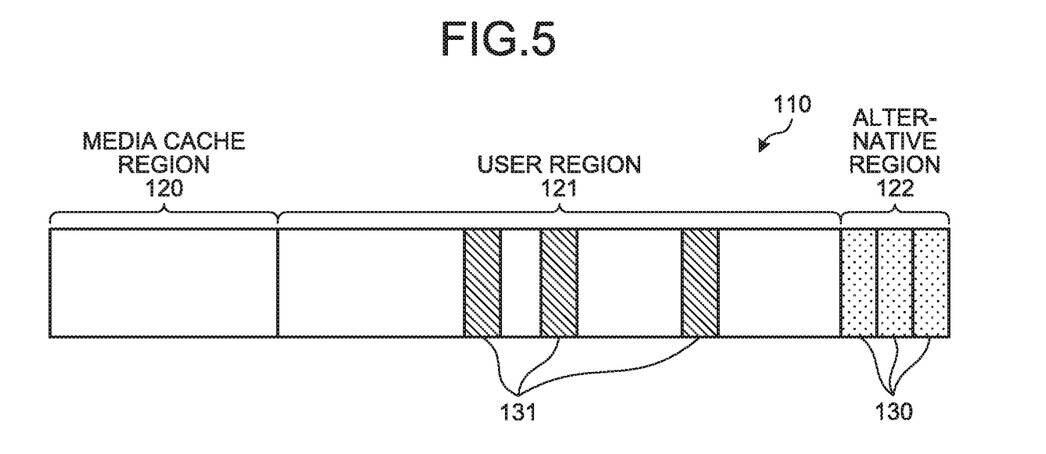
FIG. 5 is an exemplary schematic diagram for illustrating an overview of a characteristic process of the first embodiment.
Figure 6:
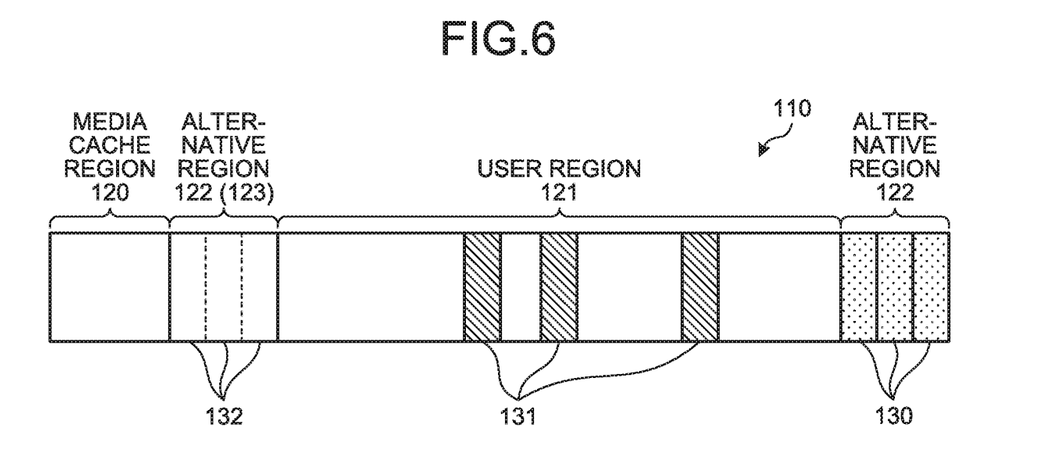
FIG. 6 is an exemplary schematic diagram for illustrating an overview of a characteristic process of the first embodiment.

FIGS. 4 to 6 are exemplary schematic diagrams for illustrating an overview of a characteristic process of the first embodiment.

FIG. 4 is an exemplary schematic diagram of the storage region 110 to which the media cache region 120, the user region 121, and the alternative region 122 are allocated. For the sake of simple explanation, the alternative region 122 includes three sectors 130 by way of example. In the example of FIG. 4 no defect occurs in any section of the user region 121, and the three sectors 130 of the alternative region 122 are in unused state (free regions).

With occurrence of three defective sectors (denoted by reference numeral 131) in the user region 121, the three defective sectors 131 are substituted with the three sectors 130 of the alternative region 122 as illustrated in FIG. 5. Thus, the alternative region 122 includes no free region.

When there is no free region in the alternative region 122, a region 123 of the media cache region 120 is added to the alternative region 122 as illustrated in FIG. 6. The region 123 is added to the alternative region 122 as a free region. Thereby, the magnetic disk device 1 can continue receiving data. FIG. 6 shows an example of deletion of three sectors 132 from the media cache region 120 and addition of the three sectors 132 to the alternative region 122.

In the following, a mode in which reception of new data is not prohibited is referred to as a normal mode. That is, the magnetic disk device 1 is operable in the normal mode or the write-protect mode.

The normal mode refers to a mode in which new data can be received, that is, data write is not prohibited. In the normal mode, both data reception and data output (read) are feasible. In the write-protect mode, data output (read) may be feasible or may be prohibited.

The operation modes of the magnetic disk device 1 may include any mode in addition to the normal mode and the write-protect mode.

Figure 7:
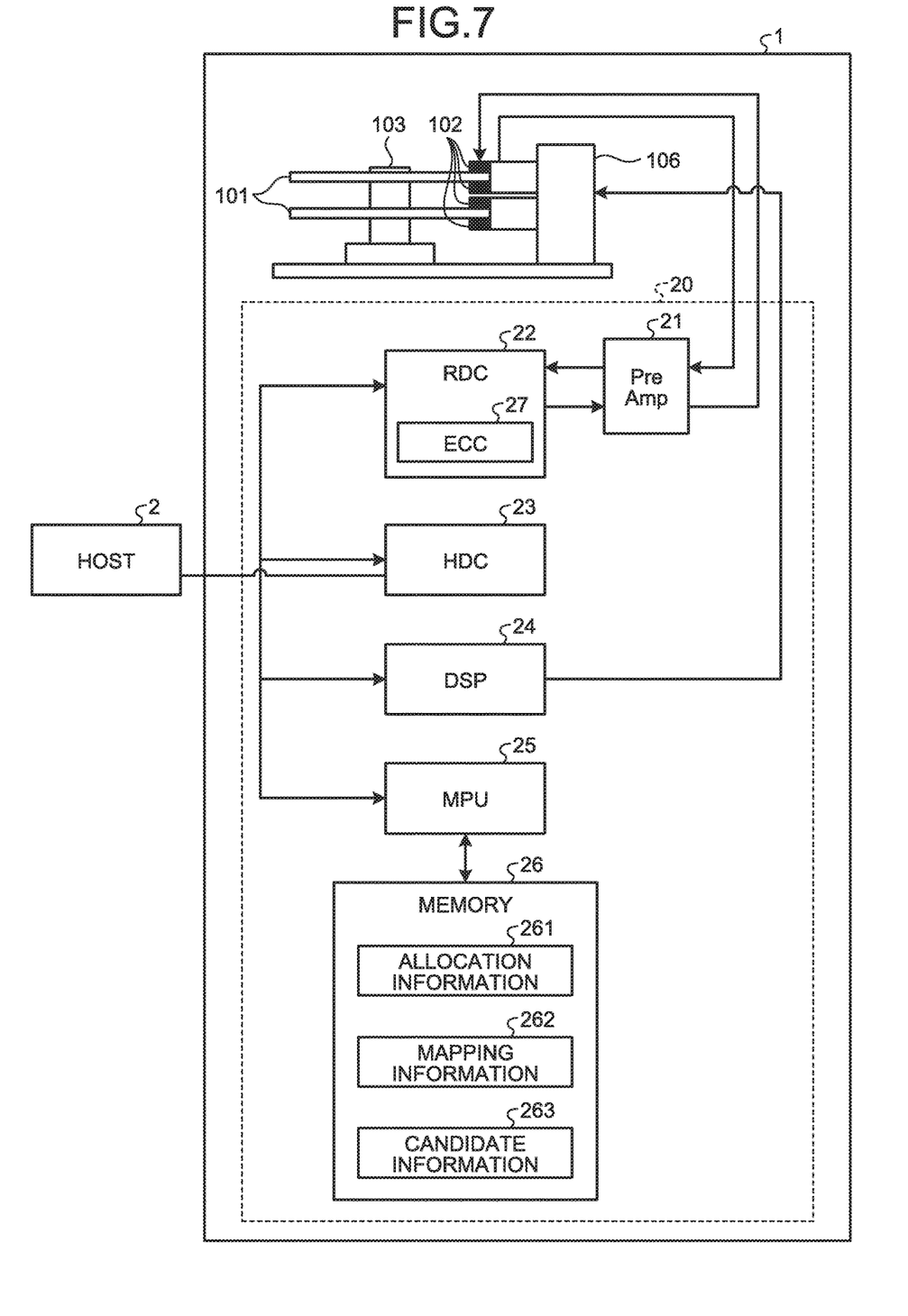
FIG. 7 is a diagram illustrating an example of a configuration of a control circuit according to the first embodiment.

FIG. 7 is a diagram illustrating an example of the configuration of the control circuit 20 according to the first embodiment. As illustrated in the figure, the control circuit 20 includes a pre-amplifier (PreAmp) 21, a read channel circuit (RDC) 22, a hard disk controller (HDC) 23, a digital signal processor (DSP) 24, a micro processing unit (MPU) 25, and a memory 26.

The pre-amplifier 21 amplifies and outputs a signal read from the magnetic disk 101 by the magnetic head 102 (read element) and supplies the amplified signal to the RDC 22. Further, the pre-amplifier 21 amplifies a signal from the RDC 22 and supplies the amplified signal to the magnetic head 102 (write element).

The RDC 22 includes an error correction code (ECC) circuit 27 that performs data encoding and decoding for error correction. The RDC 22 allows the ECC circuit 27 to encode data to be written to the magnetic disk 101 and supplies the encoded data to the pre-amplifier 21 as a signal. Further, the RDC 22 allows the ECC 27 to decode the signal read from the disk medium 101 and supplied from the pre-amplifier 21 for error detection and correction. Then, the RDC 22 outputs the error-corrected signal to the HDC 23 as digital data.

The data encoding and decoding for error correction by the ECC circuit 27 is not limited to a specific method. As one example, low density parity check (LDPC) can be employed.

Either or both of the encoding and decoding for error correction may be executed by the MPU 25 as described later.

The DSP 24 controls the spindle motor and the VCM 105 to perform positioning control such as seeking or following. Specifically, the DSP 24 performs the positioning control by obtaining and demodulating the servo information from the signal from the RDC 22 and calculating a VCM drive command value according to an error between a position demodulated from the servo information and a target position.

The HDC 23 is connected to the host 2 via a certain interface, and communicates with the host 2. A standard to which the interface conforms is not limited to a specific standard. The HDC 23 receives data from the RDC 22 and transfers the data to the host 2. Further, the HDC 23 receives data from the host 2 and outputs the data to the RDC 22.

The MPU 25 analyzes a command received from the host by the HDC 23, and controls the respective elements of the magnetic disk device 1 on the basis of results of the analysis. In particular, the MPU 25 controls the write operation to data received from the host 2, the read operation to data to be transmitted to the host 2, the substitution process, and the allocation change described with reference to FIGS. 4 to 6, for instance. In addition, the MPU 25 controls the transition of the operation mode.

The memory 26 is a data rewritable storage device. The memory 26 functions as a storage region for programs and various kinds of management information used for various kinds of processing executed by the MPU 25, a buffer region, and a cache region, for example. The memory 26 includes a volatile memory, a non-volatile memory, or a combination thereof. The volatile memory may be, for example, a static random access memory (SRAM), or a dynamic random access memory (DRAM). The non-volatile memory may be a flash memory.

The memory 26 stores allocation information 261, mapping information 262, and candidate information 263 as an example of various kinds of management information. The allocation information 261 represents information indicating locations of the respective regions (the media cache region 120, the user region 121, and the alternative region 122). The mapping information 262 represents information indicating a relationship between the logical addresses and the sectors in the storage region 110. The candidate information 263 represents information containing a highly possible defective sector. Usage of the allocation information 261, the mapping information 262 and the candidate information 263 will be described in detail in association with the operation of the magnetic disk device 1.

Next, the operation of the magnetic disk device 1 according to the first embodiment will be described.

Figure 8:
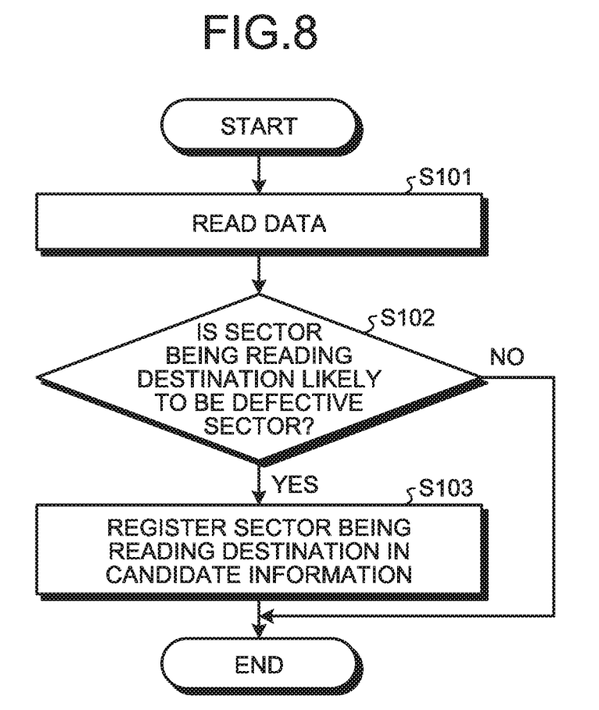
FIG. 8 is a flowchart illustrating an example of a read operation according to the first embodiment.

FIG. 8 is a flowchart illustrating an example of a read operation according to the first embodiment. Upon receiving a read command from, for example, the host 2, the control circuit 20 executes the read operation as illustrated in FIG. 8. The read command includes a logical address designating a location to read.

First, the control circuit 20 reads data from the sector of the user region 121 corresponding to the logical address included in the read command (S101).

In initial state, for example, logical addresses in the logical address space are associated with the sectors of the user region 121 one by one in accordance with the mapping information 262. A data structure of the mapping information 262 can be arbitrary. As an example, the mapping information 262 contains physical addresses designating sectors corresponding to the respective logical addresses in order of logical addresses. As another example, the mapping information 262 contains a large number of pairs of logical addresses and physical addresses.

In S101, the control circuit 20 (for example, the MPU 25) specifies a sector (a sector as a reading destination) in the user region 121 corresponding to a logical address, with reference to the mapping information 262.

Further, in S101, the control circuit 20 can read data twice or more from the sector being the reading destination. The control circuit 20 controls the ECC circuit 27 to correct error in the data read from the magnetic disk 101. Upon failure of the error correction, the control circuit 20 changes a reading parameter and executes data read and error correction again. The control circuit 20 can repeatedly read data twice or more while changing the parameter until acquiring correct data (that is, until the error correction succeeds). The parameter represents, for example, a set current value of the read element. The parameter is not limited thereto.

Then, the control circuit 20 (for example, the MPU 25) determines whether or not the sector being the reading destination is likely to be a defective sector on the basis of the result of reading in S101 (S102).

A criterion for determining whether or not the sector being the reading destination is likely to be a defective sector is not limited to a specific criterion. As an example, the MPU 25 counts the number of data reads executed in S101. When the count value of the number of data reads exceeds a certain threshold value, the MPU 25 determines that the sector being the reading destination is likely to be a defective sector. When the count value of the number of data reads does not exceed the threshold value, the MPU 25 determines that the sector being the reading destination is unlikely to be a defective sector.

When the sector as the reading destination is likely to be a defective sector (Yes in S102), the control circuit 20 (for example, the MPU 25) registers the sector in question in the candidate information 263 (S103).

In other words, the sector in question is recorded in the candidate information 263 as a candidate of defective sector. In the candidate information 263, a logical address associated with the sector being a likely defective sector, that is, a candidate of defective sector may be recorded, or a physical address indicating the sector may be recorded.

When the sector being the reading destination is unlikely to be a defective sector (No in S102) or after S103, the read operation ends. The control circuit 20 (for example, the HDC 23) transmits the error-corrected data to the host 2.

Figure 9:
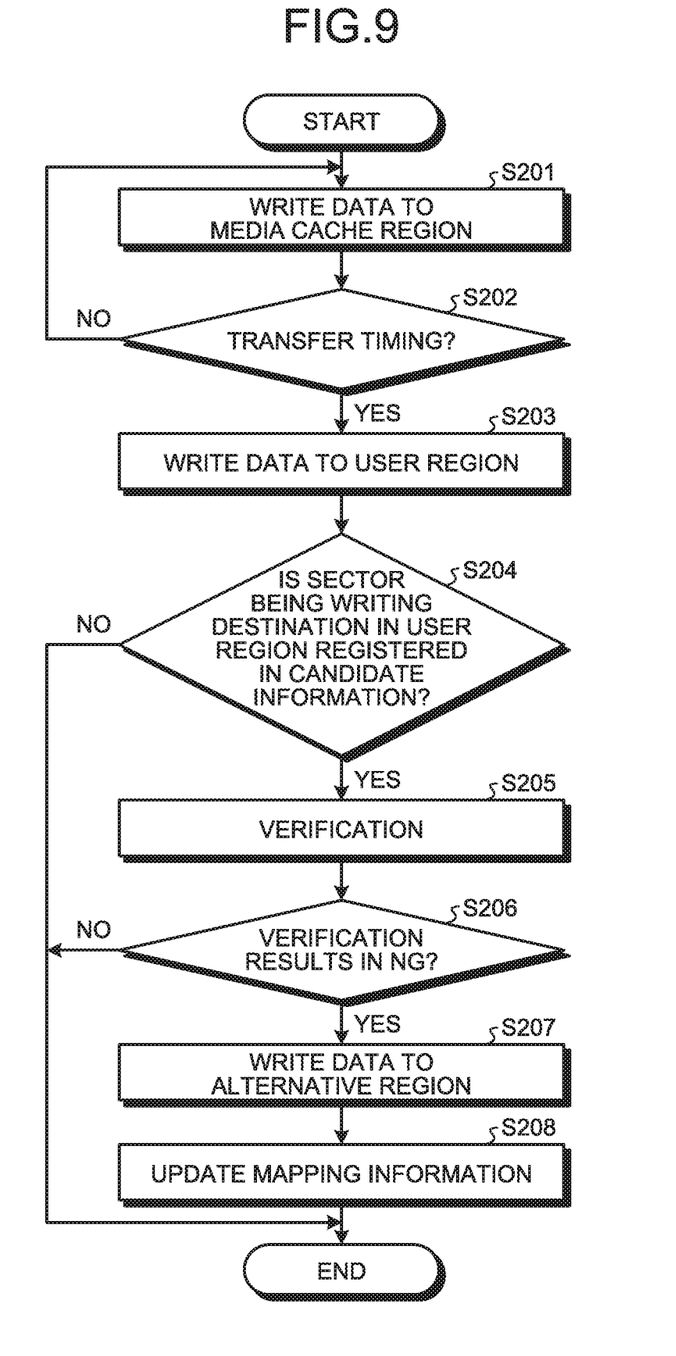
FIG. 9 is a flowchart illustrating an example of a write operation according to the first embodiment.

FIG. 9 is a flowchart illustrating an example of the writ operation according to the first embodiment. For example, upon receiving a write command from host 2, the control circuit 20 executes the write operation as illustrated in FIG. 9. The write command includes a logical address designating a location to write.

First, the control circuit 20 receives data from the host 2 and writes the data to the media cache region 120 (S201). Upon completion of the data write to the media cache region 120, the HDC 23 can notify the host 2 of the completion of the execution of the write command.

The control circuit 20 may accumulate the data received from the host 2 in the memory 26. When the amount of data accumulated in the memory 26 exceeds a certain amount, the control circuit 20 may collectively write the accumulated data in the memory 26 to the media cache region 120.

The control circuit 20 (for example, the MPU 25) determines whether or not now is a transfer timing at which data is to be transferred from the media cache region 120 to the user region 121 (S202).

A criterion for determining the transfer timing is not limited to a specific criterion. For example, the control circuit 20 may determine that now is the transfer timing when the amount of written data in the media cache region 120 exceeds a certain amount. As another example, the control circuit 20 may determine that now is the transfer timing when the control circuit 20 is in idle state, that is, is not executing an operation or another important operation.

Upon not determining that now is the transfer timing (No in S202), the control circuit 20 executes the operation in S201 again. When not determining that now is the transfer timing (No in S202), the control circuit 20 may execute the operation in S202 again.

When determining that now is the transfer timing (Yes in S202), the control circuit 20 writes, to the user region 121, the data in the media cache region 120 (S203).

For example, in S203 the control circuit 20 (for example, the MPU 25) specifies the sector (as the writing destination) of the user region 121 corresponding to the logical address indicating the location of the data in the logical address space of the media cache region 120, with reference to the mapping information 262.

When data is written to a plurality of sectors of the media cache region 120, the operation starting from S203 is executed for each sector.

Then, the control circuit 20 (MPU 25, for example) determines whether or not the sector being the writing destination in the user region 121 is registered in the candidate information 263 (S204).

Thus, in S204 the control circuit 20 determines whether or not the sector being the writing destination in the user region 121 is likely to be a defective sector.

When determining that the sector being the writing destination in the user region 121 is registered in the candidate information 263 (Yes in S204), the control circuit 20 executes verification to check whether or not the data is written normally (S205).

In S205, for example, the control circuit 20 attempts to read the written data. Thereby, the control circuit 20 checks whether or not the data is normally read. In other words, the control circuit 20 checks whether or not the same data as data before writing is obtained by the reading. At the time of verification, the ECC circuit 27 may or may not execute the error correction. For example, upon acquiring the same data as the data before writing through the reading, the control circuit 20 determines verification as OK. Upon acquiring no same data as the data before writing through the reading, the control circuit 20 determines verification as NG.

The details of the verification are not limited thereto. The control circuit 20 may also read data twice or more during the verification.

If the verification results in NG (Yes in S206), the control circuit 20 determines that the sector as the writing destination in the user region 121 is a defective sector. In other words, the control circuit 20 detects or specifies the sector being the writing destination in the user region 121 as a defective sector. In this case, the control circuit 20 writes, from the media cache region 120 to the alternative region 122, the same data as the data written in the defective sector in S203 (S207).

In S207, for example, the control circuit 20 (for example, the MPU 25) can specify the location of the alternative region 122, referring to the allocation information 261. The control circuit 20 (for example, the MPU 25) selects, as the writing destination, an available sector, that is, a sector not yet used for the substitution from among one or more sectors of the alternative region 122.

Subsequently to S207, the control circuit 20 (for example, the MPU 25) updates the mapping information 262 (S208). That is, the control circuit 20 changes the sector corresponding to the logical address indicating the location of the data, written to the defective sector in S203, in the logical address space from the determined defective sector to the sector of the alternative region 122 as a writing destination.

Thereby, the control circuit 20 can specify the sector of the alternative region 122 as the reading destination to process the read command including the logical address, referring to the mapping information 262. In other words, the sector determined as the defective sector is substituted with the sector of the alternative region 122.

When determining that the sector being the writing destination in the user region 121 is not registered in the candidate information (No in S204), when the verification results in OK (No in S206), or after S208, the control circuit 20 completes the write operation.

The control circuit 20 may delete data from a sector of the media cache region 120 as a transfer source immediately before completing the write operation.

Figure 10:
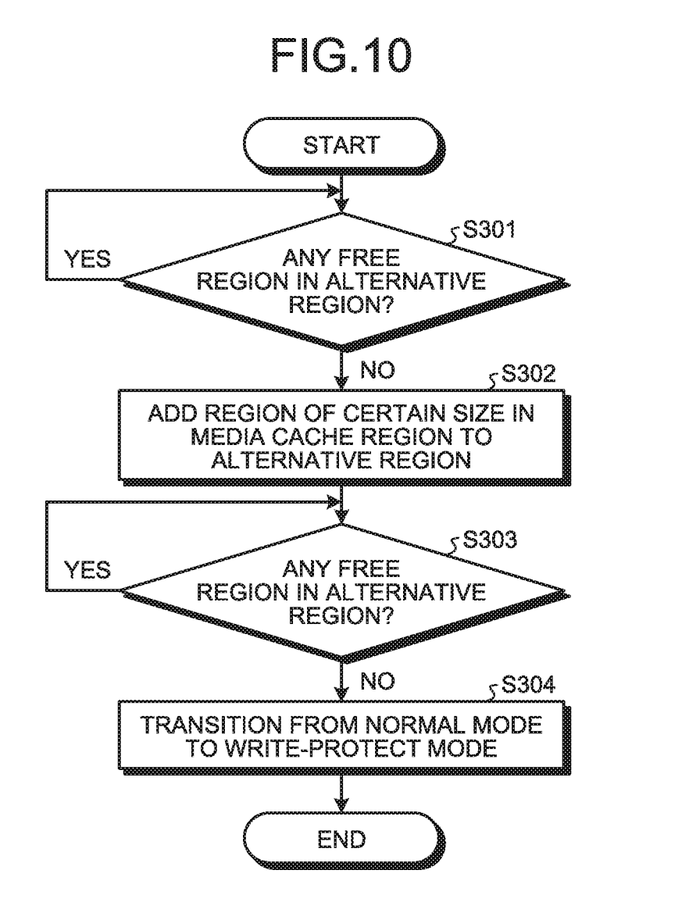
FIG. 10 is a flowchart illustrating an example of an allocation updating process according to the first embodiment.

FIG. 10 is a flowchart illustrating an example of allocation update of the respective regions (the media cache region 120, the user region 121, and the alternative region 122) according to the first embodiment.

The control circuit 20 (for example, the MPU 25) determines whether or not there is a free region, that is, a sector to substitute in the alternative region 122 (S301).

The operation in S301 can be implemented by an arbitrary method. For example, the control circuit 20 (for example, the MPU 25) can count the number of sectors to which data is written, among the sectors of the alternative region 122, and subtract the number of the sectors to which data is written from the number of all the sectors of the alternative region 122, to find the number of sectors to substitute. Unless the number of sectors to substitute is zero, the control circuit 20 (for example, the MPU 25) determines that there is a free region in the alternative region 122. When the number of sectors to substitute is zero, the control circuit 20 (for example, the MPU 25) determines that there is no free region in the alternative region 122.

When determining that there is a free region in the alternative region 122 (Yes in S301), the control circuit 20 (for example, the MPU 25) executes the operation in S301 again. When determining that there is no free region in the alternative region 122 (No in S301), the control circuit 20 (for example, the MPU 25) updates the allocation information 261, and adds a region of a certain size in the media cache region 120 to the alternative region 122 (S302).

After adding the free region, the control circuit 20 (for example, the MPU 25) determines whether or not there is a free region in the alternative region 122, as in S301 (S303).

When determining that there is a free region in the alternative region 122 (Yes in S303), the control circuit 20 (for example, the MPU 25) executes the operation in S303 again.

When determining that there is no free region in the alternative region 122 (No in S303), the control circuit 20 (for example, the MPU 25) transitions from the normal mode to the write-protect mode (S304). This ends the allocation updating process.

As described above, according to the first embodiment, the control circuit 20 executes defect detection to the user region 121 (S102 and S103 of FIG. 8 and S204 to S206 of FIG. 9). Upon detecting a defect in the user region 121 (Yes in S206 of FIG. 9), the control circuit 20 substitutes the sector of the user region 121 having the defect with the sector of the alternative region 122 (S207 and S208 of FIG. 9). When there is no free region in the alternative region 122 (No in S301 of FIG. 10), the control circuit 20 adds a region of a certain size in the media cache region 120 to the alternative region 122 (S302 of FIG. 10).

That is, with no free region found in the alternative region 122, the control circuit 20 does not transition to the write-protect mode immediately but adds a free region to the alternative region 122, using the media cache region 120. This makes it possible to extend the length of the period in which data can be received.

According to the magnetic disk device 1 as configured above, for example, the magnetic head 102 makes a characteristic movement while the control circuit 20 consecutively write data to a plurality of defective regions. Such a characteristic movement will be described with reference to the example of FIG. 3.

For consecutively writing data to two or more defective regions, the control circuit 20 first controls the magnetic head 102 to move to a region (the alternative region 122 in FIG. 3) closest to the radial center of the magnetic disk 101. After completion of continuously writing to the region, the control circuit 20 controls the magnetic head 102 to move to another region (the media cache region 120 in FIG. 3) farthest from the radial center of the magnetic disk 101 and resumes writing.

In the above description, the substitutive allocation is executed in unit of sectors. The substitutive allocation may be performed in arbitrary unit other than the sectors.

Further, the first embodiment has described the example of adding the region to the alternative region 122 when there is no longer free region in the alternative region 122. A trigger condition for adding the region to the alternative region 122 is not limited to no free region in the alternative region 122. For example, upon detecting the total size of the free regions in the alternative region 122 as being lower than a certain value, the control circuit 20 may add the region to the alternative region 122.

The first embodiment has described the example of adding part of the media cache region 120 to the alternative region 122. Alternatively, the entire media cache region 120 may be added to the alternative region 122.

Further, the first embodiment has described the example of adding a region of a certain size in the media cache region 120 to the alternative region 122. Alternatively, the size of the region to add may be defined as a ratio to the size of the media cache region 120.

Further, The first embodiment has described the example that, when no free region is found in the alternative region 122 for the second time (No in S303), the control circuit 20 transitions from the normal mode to the write-protect mode (S304). Alternatively, the control circuit 20 may also add another part of the media cache region 120 to the alternative region 122 when no free region is found in the alternative region 122 at the second time. In other words, the region can be added to the alternative region 122 twice or more as long as the media cache region 120 includes an available region.

Further, the control circuit 20 specifies a candidate of the defective sector on the basis of the result of reading at the time of data read (S102 and S103 of FIG. 8), executes the verification when another data is overwritten to the defective sector candidate (S204 and S205 of FIG. 9), and determines whether or not the defective sector candidate is a defective sector on the basis of the result of the verification (S206 of FIG. 9). A defect detecting method is not limited thereto. For example, the control circuit 20 may detect a defect on the basis of the result of reading in the read operation alone.

Further, the defective sector can be detected at arbitrary timing by an arbitrary method. The timing at which the region is added to the alternative region 122 is not limited to the write operation alone.

Further, the first embodiment has described the example that the media cache region 120, the user region 121, and the alternative region 122 are allocated in this order from the farthest location to the closest location with respect to the radial center of the magnetic disk 101. The locations to which the media cache region 120, the user region 121, and the alternative region 122 are allocated are not limited thereto.

For example, the storage region 110 may be radially divided into a plurality of zones to set a recording density individually for the respective zones. This is known as zone constant angular velocity (CAV). Using the zone CAV, the alternative region 122 may be distributed to the zones. In other words, the user region 121 and the alternative region 122 can be allocated to each zone.

As another example, the alternative region 122, the user region 121, and the media cache region 120 may be allocated in this order from the farthest location to the closest location relative to the radial center of the magnetic disk 101.

Each of the regions may be allocated to a plurality of magnetic disks 101 in a same manner or different manners.

Second Embodiment

In the first embodiment, when no free region is found in the alternative region 122 (No in S301 of FIG. 10), the control circuit 20 adds the region to the alternative region 122 while continuously operating in the normal mode.

A second embodiment will describe an example that the control circuit 20 temporarily transitions from the normal mode to the write-protect mode before adding the region to the alternative region 122.

The second embodiment will describe only operations different from the first embodiment. The descriptions of the same operations as in the first embodiment will be omitted.

Figure 11:
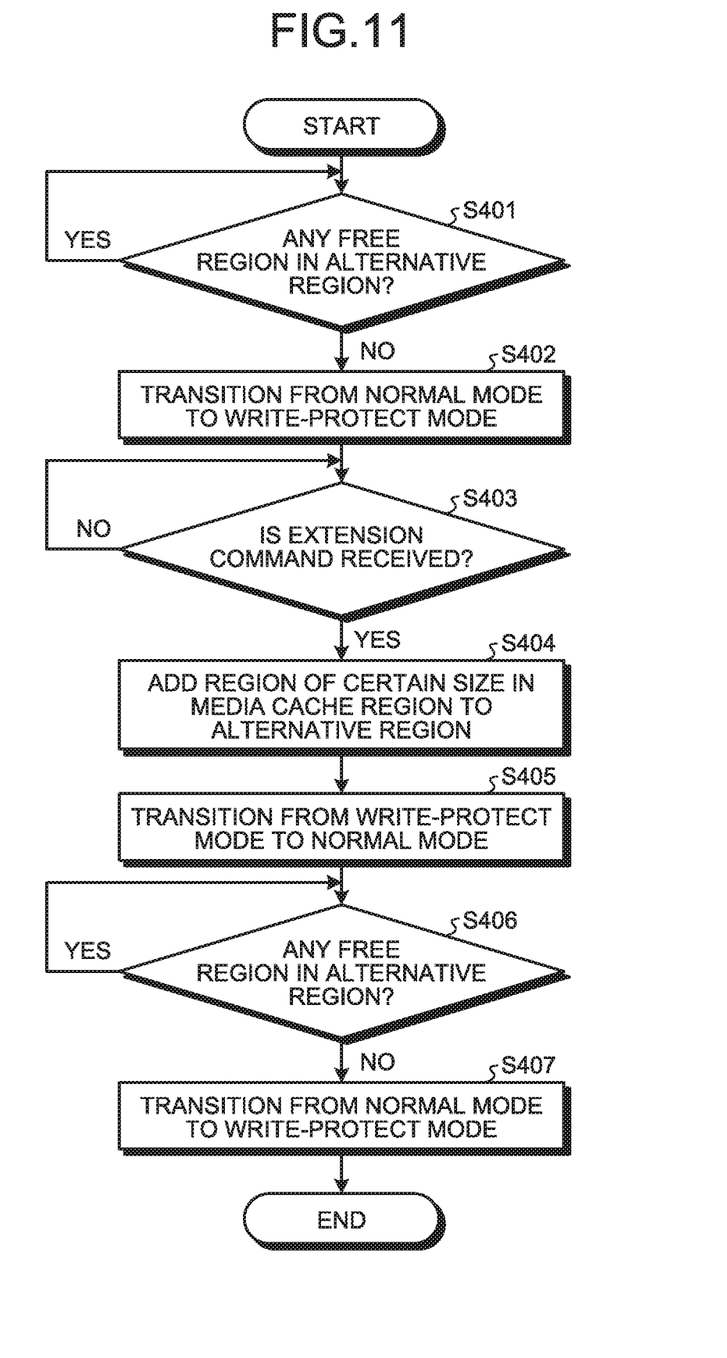
FIG. 11 is a flowchart illustrating an example of an allocation updating process according to a second embodiment.

FIG. 11 is a flowchart illustrating an example of allocation updating of the respective regions (the media cache region 120, the user region 121, and the alternative region 122) according to the second embodiment.

The control circuit 20 (for example, the MPU 25) determines whether or not there is a free region, that is, a sector to substitute in the alternative region 122 (S401) The operation of S401 is identical to, for example, the operation of S301.

When determining that there is a free region in the alternative region 122 (Yes in S401), the control circuit 20 (for example, the MPU 25) executes the operation in S401 again. When determining that there is no free region in the alternative region 122 (No in S401), the control circuit 20 transitions from the normal mode to the write-protect mode (S402).

For example, the control circuit 20 (for example, the HDC 23) notifies the host 2 of the transition of the operation executed in S402. In the second embodiment, the host 2 can transmit a command (an extension command) to the magnetic disk device 1 in order to extend the operation period in the normal mode.

The control circuit 20 (for example, the HDC 23) may not notify the host 2 of the transition of the operation mode executed in S402. Upon receiving a write command from the host in the write-protect mode, the control circuit 20 (for example, the HDC 23) may transmit a response that reception of the write command is being suspended to the host 2. Upon receipt of the response, the host 2 can recognize the transition of the control circuit 20 to the write-protect mode. The host 2 can transmit the extension command after recognizing the transition to the write-protect mode.

A format of the extension command is not limited to a specific format. For example, when the communication path between the magnetic disk 101 and the host 2 conforms to small computer system interface (SCSI) standard, the extension command may be prepared as one of ModeSelect commands.

In the write-protect mode, the control circuit 20 waits for the extension command (No in S403). When receiving the extension command (Yes in S403), the control circuit 20 (for example, the MPU 25) updates the allocation information 261 to add a region of a certain size in the media cache region 120 to the alternative region 122 (S404). Then, the control circuit 20 (for example, the MPU 25) transitions from the write-protect mode to the normal mode (S405).

For example, the control circuit 20 (for example, the HDC 23) notifies the host 2 of the transition of the operation mode executed in S405. The host 2 can transmit the write command after recognizing the transition to the normal mode.

Then, in S406 and S407, the control circuit 20 executes the same operations as in S303 and S304 of FIG. 10, ending the allocation updating process.

As described above, in the second embodiment, the control circuit 20 transitions from the normal mode to the write-protect mode (S402 of FIG. 11) when no free region is found in the alternative region 122 (No in S401 of FIG. 11) In the write-protect mode, when receiving the extension command from the host 2 (Yes in S403 of FIG. 11), the control circuit 20 adds a region of a certain size in the media cache region 120 to the alternative region 122 (S404 of FIG. 11), and transitions from the write-protect mode to the normal mode (S405 of FIG. 11).

This enables the following operations. For example, from the transition of the magnetic disk device 1 from the normal mode to the write-protect mode, the user can recognize that the magnetic disk device 1 is approaching the end of the product's longevity. Upon recognizing such a situation, the user operates the host 2 to transmit the extension command from the host 2 to the magnetic disk device 1. Addition of the free region to the alternative region 122 enables the magnetic disk device 1 to operate in the normal mode for a while. In the meantime the user can prepare another magnetic disk device for replacement before the magnetic disk device 1 transitions from the normal mode to the write-protect mode.

Thus, even if the magnetic disk device 1 temporarily transitions from the normal mode to the write-protect mode, the magnetic disk device 1 can be usable in a prolonged length of time. The user can prepare another magnetic disk device within the prolonged period to be able to minimize the length of time for which the operation of the host 2 is stopped.

According to the second embodiment, as in the first embodiment, it is also possible to variously modify the unit of the allocation, the method of setting the size of the region to add to the alternative region 122, and the number of additions of the regions to the alternative region 122.

Third Embodiment

In the second embodiment, the size of the region to add to the alternative region 122 is set in advance.

A third embodiment will describe an example that the size of the region to add to the alternative region 122 can be set by the host 2.

The third embodiment describes operations different from the first and second embodiments alone, and omit description of the same operations.

Figure 12:
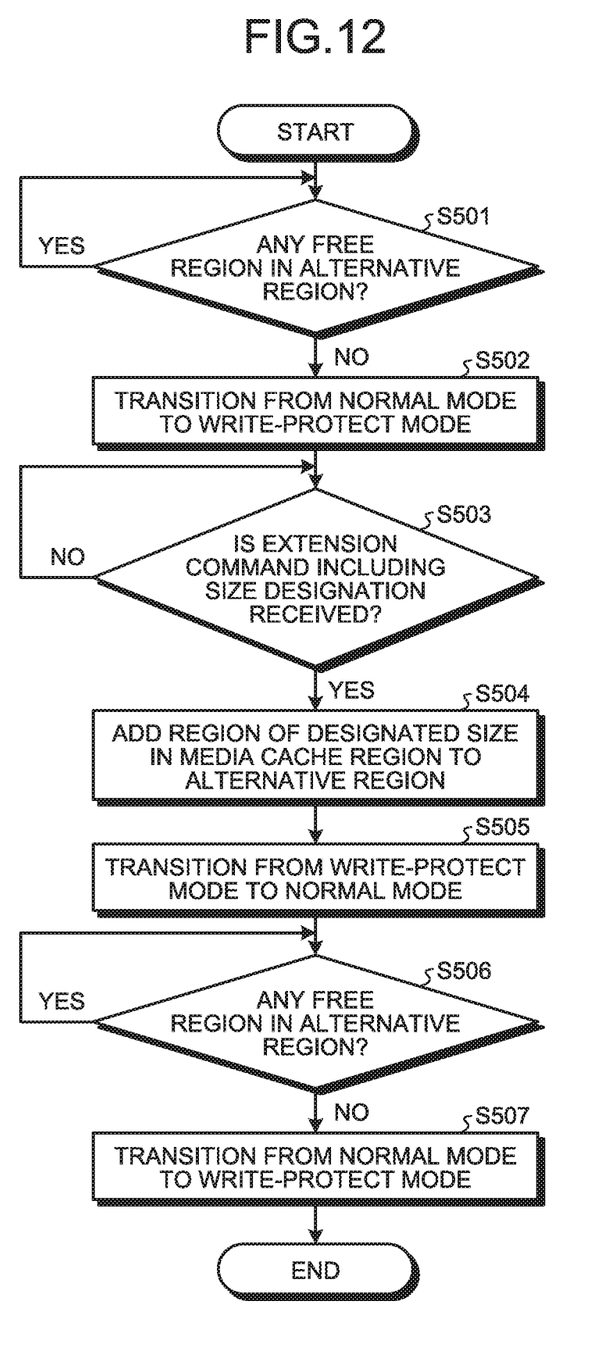
FIG. 12 is a flowchart illustrating an example of an allocation updating process according to a third embodiment.

FIG. 12 is a flowchart illustrating an example of allocation updating of the respective regions (the media cache region 120, the user region 121, and the alternative region 122) according to the third embodiment.

In S501 and S502, the control circuit 20 executes the same operations as in S401, S402 of FIG. 11.

In the third embodiment, the extension command may include a size designation. The size of the region may be specified in accordance with a ratio to the size of the media cache region 120.

In the write-protect mode, the control circuit 20 waits for the extension command including the size designation (No in S503). Upon receiving the extension command including the size designation (Yes in S503), the control circuit 20 (for example, the MPU 25) updates the allocation information 261 and adds a region of the size designated by the extension command in the media cache region 120 to the alternative region 122 (S504). Then, the control circuit 20 (for example, the MPU 25) transitions from the write-protect mode to the normal mode (S405).

In S505 to S507, the control circuit 20 executes the same operations as in S405 to S407 in FIG. 11, ending the allocation updating process.

As described above, the magnetic disk device 1 can be configured to designate the size or the ratio of the region to be added to the alternative region 122 by the command.

The first to third embodiments may be appropriately combined. According to any of the first to third embodiments, the control circuit 20 detects a defect in the user region 121, and substitutes a first location having the detected defect in the user region 121 with a second location in the alternative region 122. The control circuit 20 deletes part or all of the media cache region 120 depending on the total size of the free regions in the alternative region 122, and adds the deleted regions to the alternative region 122.

This enables the extension of the period in which data reception is feasible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
   a disk medium to which a first region, a second region, and a third region are allocated, the first region being a region to which first data received from a host is written, the second region being a region to which the first data is temporarily written before the first data is written to the first region, the third region being a redundant region; and
   a control circuitry that
      executes defect detection to the first region,
      in a case where a defect is detected in the first region, substitutes a first location having the defect in the first region with a second location in the third region,
      depending on a total size of free regions of the third region, reallocates a fourth region from the second region to the third region, the fourth region being part or all of the second region.

2. The magnetic disk device according to claim 1, wherein in a case where there is no free region in the third region, the control circuitry reallocates the fourth region from the second region to the third region.

3. The magnetic disk device according to claim 2, wherein a size of the fourth region is set in advance.

4. The magnetic disk device according to claim 1, wherein the control circuitry
   operates in a plurality of modes including a first mode and a second mode, the first mode being a mode in which new data is receivable from the host, the second mode being a mode in which reception of new data from the host is prohibited,
   transitions from the first mode to the second mode in a case where there is no free region in the third region, and
   upon receiving a command from the host in the second mode, reallocates the fourth region from the second region to the third region, and transitions from the second mode to the first mode.

5. The magnetic disk device according to claim 4, wherein the command includes information designating a size of the fourth region.

6. The magnetic disk device according to claim 1, wherein the control circuitry
   operates in a plurality of modes including a first mode and a second mode, the first mode being a mode in which new data is receivable from the host, the second mode being a mode in which reception of new data from the host is prohibited,
   in a case where there is no free region in the third region, reallocates the fourth region from the second region to the third region while maintaining the first mode, and
   in a case where there is no free region in the third region after the reallocation, transitions from the first mode to the second mode.

7. The magnetic disk device according to claim 1, wherein the control circuitry reads second data being written data from the first region, and determines whether or not a defect occurs at a location of the second data in the first region, on the basis of a result of the reading of the second data.

8. The magnetic disk device according to claim 7, wherein the control circuitry verifies, after overwriting the second data with third data, the third data, and determines whether or not a defect occurs at a location at which the second data has been overwritten with the third data, on the basis of the result of the reading of the second data and a result of the verification.

9. A control method, comprising:
   executing defect detection to a first region of a disk medium to which the first region, a second region, and a third region are allocated, the first region being a region to which first data received from a host is written, the second region being a region to which the first data is temporarily written before the first data is written to the first region, the third region being a redundant region;
   in a case where a defect is detected in the first region, substituting a first location having the defect in the first region with a second location in the third region; and
   depending on a total size of free regions of the third region, reallocating a fourth region from the second region to the third region, the fourth region being part or all of the second region.

10. The control method according to claim 9, wherein the deleting and the adding are, in a case where there is no free region in the third region, deleting the fourth region from the second region and adding the fourth region to the third region.

11. The control method according to claim 10, wherein a size of the fourth region is set in advance.

12. The control method according to claim 9, the control method further comprising:
   operating in a plurality of modes including a first mode and a second mode, the first mode being a mode in which new data is receivable from the host, the second mode being a mode in which reception of new data from the host is prohibited;
   transitioning from the first mode to the second mode in a case where there is no free region in the third region; and
   upon receiving a command from the host in the second mode, deleting the fourth region from the second region and adding the fourth region to the third region, and transitioning from the second mode to the first mode.

13. The control method according to claim 12, wherein the command includes information designating a size of the fourth region.

14. The control method according to claim 9, the control method further comprising:
   operating in a plurality of modes including a first mode and a second mode, the first mode being a mode in which new data is receivable from the host, the second mode being a mode in which reception of new data from the host is prohibited;

in a case where there is no free region in the third region, deleting the fourth region from the second region and adding the fourth region to the third region while maintaining the first mode; and in a case where there is no free region in the third region after the fourth region is added, transitioning from the first mode to the second mode.

15. The control method according to claim 9, the control method further comprising:

reading second data being written data from the first region; and determining whether or not a defect occurs at a location of the second data in the first region, on the basis of a result of the reading of the second data.

16. The control method according to claim 15, the control method further comprising:

overwriting the second data with third data;

verifying the third data; and determining whether or not a defect occurs at a location at which the second data has been overwritten with the third data, on the basis of the result of the reading of the second data and a result of the verifying.

* * * * *